(12) United States Patent
Li et al.

(10) Patent No.: US 11,770,731 B2
(45) Date of Patent: Sep. 26, 2023

(54) TARGET WAKE TIME TRAFFIC DIFFERENTIATION AND SERVICE PERIOD EXTENSION

(71) Applicant: Apple Inc., Cupertino, CA (US)

(72) Inventors: Guoqing Li, Campbell, CA (US); Yang Yu, Cupertino, CA (US); Welly Kasten, Cupertino, CA (US); Shehla S. Rana, Cupertino, CA (US); Mete Fikirlier, Cupertino, CA (US); Karthik R. Mekala, Cupertino, CA (US); Charles F. Dominguez, Redwood City, CA (US); Yong Liu, Cupertino, CA (US); Rajneesh Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 16/555,356

(22) Filed: Aug. 29, 2019

(65) Prior Publication Data

US 2020/0137612 A1    Apr. 30, 2020

Related U.S. Application Data

(60) Provisional application No. 62/752,095, filed on Oct. 29, 2018.

(51) Int. Cl.
*H04W 28/02* (2009.01)
*H04W 52/02* (2009.01)

(52) U.S. Cl.
CPC ... *H04W 28/0221* (2013.01); *H04W 52/0216* (2013.01); *H04W 52/0229* (2013.01); *H04W 52/0206* (2013.01)

(58) Field of Classification Search
CPC ......... H04W 28/0221; H04W 52/0216; H04W 52/0229; H04W 52/0206
See application file for complete search history.

(56) References Cited

U.S. PATENT DOCUMENTS

2016/0381704 A1* 12/2016 Chu ................. H04W 52/0216
370/329
2017/0164371 A1*  6/2017 Kim ................. H04W 74/0816
(Continued)

*Primary Examiner* — Walter J Divito
*Assistant Examiner* — Anthony Luo
(74) *Attorney, Agent, or Firm* — Sterne, Kessler, Goldstein & Fox P.L.L.C.

(57) ABSTRACT

Some embodiments of this disclosure include apparatuses and methods for implementing a target wake time (TWT) scheme that includes traffic differentiation and service period extension. For example some embodiments relate to an electronic device including a transceiver and one or more processors communicatively coupled to the transceiver. The one or more processors receive an indication of traffic associated with an application. The one or more processors determine information associated with the traffic and configure the TWT scheme associated with the traffic based at least in part on the determined information. The one or more processors further communicate initial information associated with the TWT scheme to an access point of a wireless network. The initial information associated with the TWT scheme can include at least one of traffic direction information, traffic pattern information, a traffic identifier (TID), or an access category, indication (ACID).

20 Claims, 9 Drawing Sheets

(56) References Cited

U.S. PATENT DOCUMENTS

2018/0132175 A1* 5/2018 Choi .................. H04W 72/0446
2019/0253967 A1* 8/2019 Xiao .................... H04W 76/25
2021/0204204 A1* 7/2021 Kim .................... H04W 72/042

* cited by examiner

FIG. 5A

| Element ID | Length | Control | TWT Parameter Information |
|---|---|---|---|
| 501 | 502 | 503 | 504 |
| 1 | 1 | 1 | variable |

FIG. 5B

| Request Type | Target Wake Time | TWT Group Assignment | Nominal Minimum TWT Wake Duration | TWT Wake Interval Mantissa | TWT Channel | NDP Paging (optional) |
|---|---|---|---|---|---|---|
| 511 | 512 | 513 | 514 | 515 | 516 | 517 |
| 2 | 0 or 8 | 0, 3 or 9 | 1 | 2 | 1 | 0 or 4 |

FIG. 5C

| TWT Request | TWT Setup Command | Reserved | Implicit | Flow Type | TWT Flow Identifier | TWT Wake Interval Exponent | TWT Protection |
|---|---|---|---|---|---|---|---|
| 531 | 532 | 533 | 534 | 535 | 536 | 537 | 538 |

TARGET WAKE TIME TRAFFIC DIFFERENTIATION AND SERVICE PERIOD EXTENSION

CROSS-REFERENCE TO RELATED APPLICATIONS

The present application claims the benefit of U.S. Provisional Patent Application No. 62/752,095, filed on Oct. 29, 2018, which is hereby incorporated by reference in its entirety.

BACKGROUND

Field

The described embodiments generally relate to channel access in wireless communications.

Related Art

Target wake time (TWT) is a power saving mechanism that can be used with communication techniques compatible with institute of Electrical and Electronics Engineers (IEEE) 802.11 standards (such as, but not limited to IEEE 802.11ax). For example, the TWT scheme (or technique) can be used within a wireless local area Network (WLAN). In this example, an access point (AP) and one or more stations (STAs) can negotiate a specific time or a set of times for the stations to access a medium. The TWT scheme can be used to control the amount of contention over the medium by allowing the station to set up a periodic active/sleep (power save) schedule with the access point. Using the TWT scheme, the station does not need to send explicit power save and active transition notifications to the access point, which was traditionally done through, for example, setting a power management (PM) indication bit in a media access control (MAC) header of a MAC frame. In a congested environment, the successful transmission of PM indication bit may take long time, and thus the use of the TWT scheme allows the station to transition between an active mode and a sleep mode in a responsive manner, improving power consumption and latency.

SUMMARY

Some embodiments of this disclosure include apparatuses and methods for implementing an improved target wake time (TWT) scheme (or technique). The improved TWT scheme can include information associated with the traffic for which TWT is set up, traffic differentiation, and service period extension.

Some embodiments relate to an electronic device. The electronic device includes a transceiver configured to communicate over a wireless network and one or more processors communicatively coupled to the transceiver. The one or more processors receive an indication of traffic associated with an application, where the application desires to communicate with the wireless network and the traffic is to be communicated over the wireless network. The one or more processors determine information associated with the traffic and configure a target wake time (TWT) scheme associated with the traffic based at least in part on the determined information associated with the traffic. The one or more processors communicate initial information associated with the TWT scheme to an access point of the wireless network. The initial information associated with the TWT scheme includes at least one of traffic direction information, traffic pattern information, a traffic identifier (TID), or an access category indication (ACID). Configuring the TWT scheme may include generating at least one of an initial TWT element or an initial information element that includes the initial information associated with the TWT scheme.

Some embodiments relate to a method including receiving an indication of traffic associated with an application of an electronic device, where the application desires to communicate with a wireless network and the traffic is to be communicated over the wireless network. The method further includes determining information associated with the traffic and configuring a target wake time (TWT) scheme associated with the traffic based at least in part on the determined information. The method also includes generating an initial TWT element associated with the TWT scheme and communicating the initial TWT element to an access point of the wireless network. The initial TWT element includes at least one of traffic direction information, traffic pattern information, a traffic identifier (TID), or an access category indication (ACID).

Some embodiments relate to a non-transitory computer-readable medium storing instructions. When the instructions are executed by a processor of an electronic device, the instructions cause the processor to perform operations including determining information associated with traffic of an application of the electronic device, where the application desires to communicate with a wireless network and the traffic is to be communicated over the wireless network. The operations further include configuring a target wake time (TWT) scheme associated with the traffic based at least in part on the determined information, generating an initial TWT element associated with the TWT scheme, and communicating the initial TWT element to an access point of the wireless network. The initial TWT element comprises at least one of a first field corresponding to the traffic pattern information associated with the traffic, a first subfield of a second field corresponding to traffic direction information associated with the traffic, or a second subfield of the second field corresponding to a traffic identifier (TID) or an access category indication (ACID) associated with the traffic This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 5A-5C illustrate an exemplary TWT element format for implementing TWT scheme with traffic differentiation and service period extension, according to some embodiments of the disclosure.

Figure 1:
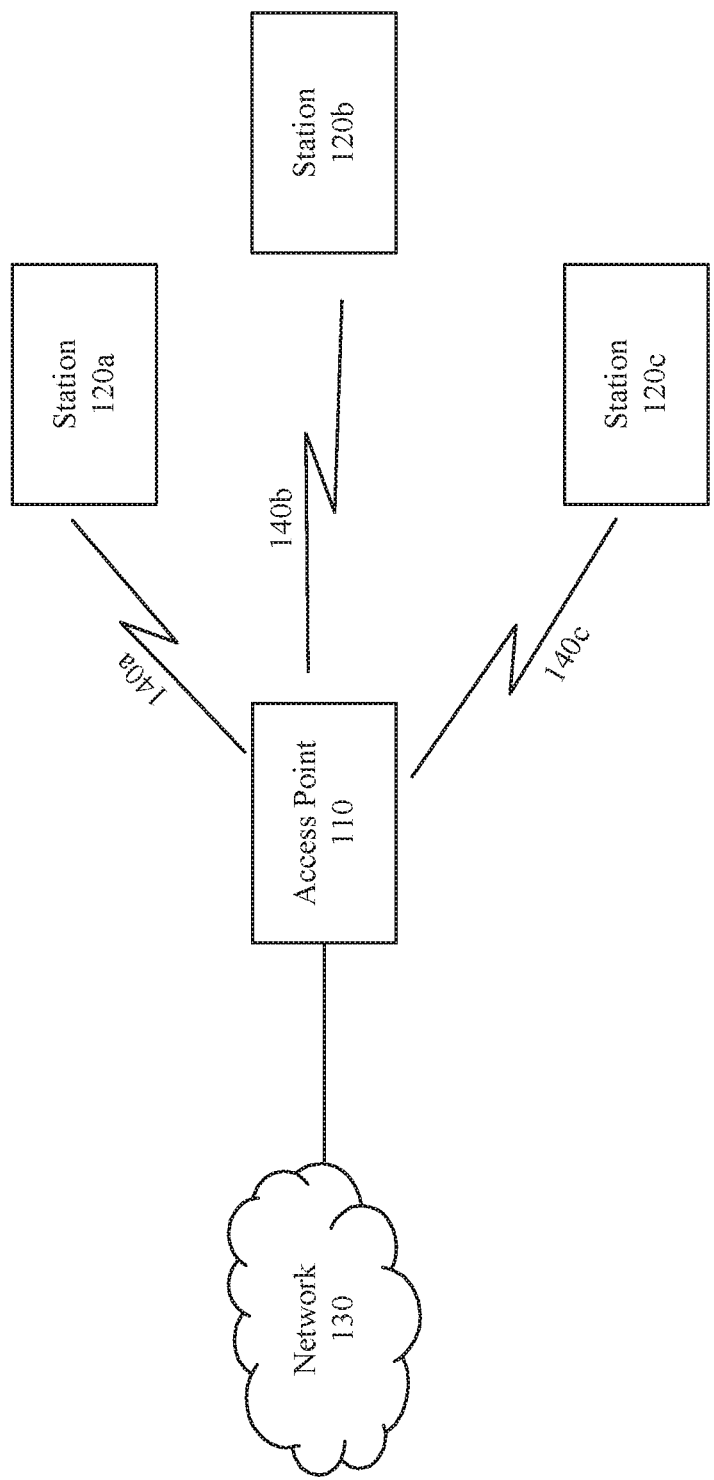
FIG. 1 illustrates an example system implementing a TWT scheme with traffic differentiation and service period extension, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing an improved target wake time (TWT) scheme. The improved TWT scheme can include traffic differentiation and service period extension.

TWT is a mechanism that enables, for example, an electronic device (e.g., an access point) to negotiate and/or define a specific time or a set of times for other electronic devices (e.g., a station) to access a medium. As discussed in more detail, after a TWT schedule is configured, the access point (AP) can transmit packets to and/or receive packets from the station (STA) during scheduled period(s). Accordingly, the station can be awake during the scheduled periods to transmit and/or receive the packets and can be asleep or perform other activities outside of the scheduled periods.

According to some embodiments, the TWT scheme can be designed such that a TWT request from a station (STA) to an access point (AP) can include an explicit indication to indicate whether the TWT parameters are for uplink and downlink traffic, only for downlink traffic, or only for uplink traffic. Additionally or alternatively, the TWT scheme can be designed such that the TWT request from the STA to the AP can include an explicit indication to indicate the traffic direction. For example, the TWT request can indicate whether the TWT parameters are for a one-directional traffic (only for uplink traffic or only for downlink traffic) or for a bidirectional/symmetrical traffic. In these embodiments, the AP can use the TWT parameters and expand these parameters. For example, the AP can expand the parameters to almost twice the TWT parameters if traffic is indicated as bidirectional/symmetrical.

According to some embodiments, the STA, using the TWT scheme, can add an indication of the traffic pattern to the TWT request. The indication of the traffic pattern can include, but is not limited to, application traffic generation interval, traffic rate, or the like. Additionally or alternatively, the STA, using the TWT scheme, can add an indication of a specific traffic identifier (TID), an indication of a specific traffic, and/or an indication of an access category (ACID) associated with the TWT. In this example, the TWT asleep/awake schedule can be associated with the type of application that will use the TWT scheme. In some example, the TWT scheme can allow the AP to extend service period(s) automatically.

FIG. 1 illustrates an example system 100 implementing a TWT scheme (or technique) with traffic differentiation and service period extension, according to some embodiments of the disclosure. Example system 100 is provided for the purpose of illustration only and does not limit the disclosed embodiments. System 100 may include, but is not limited to, access point (AP) 110, stations (STA) 120, and network 130. Stations 120a-120c may include, but are not limited to, Wireless Local Area Network (WLAN) stations such as wireless communication devices, smart phones, laptops, desktops, tablets, personal assistants, monitors, televisions, and the like. Access point (AP) 110 may include but is not limited to WLAN electronic devices such as a wireless router, a wearable device (e.g., a smart watch), a wireless communication device (e.g., a smart phone), or a combination thereof. Network 130 may be the Internet and/or a WLAN. Station 120's communications are shown as wireless communications 140. The communication between AP 110 and STA 120 can take place using wireless communications 140a-140c. The wireless communications 140a-140c can be based on a wide variety of wireless communication techniques. These techniques can include, but are not limited to, techniques based on IEEE 802.11, such as IEEE 802.11v, IEEE 802.11ax, etc. standards.

According to some embodiments, AP 110 and STAs 120 are configured to implement the TWT scheme with traffic differentiation and service period extension. AP 110 is configured to negotiate and/or define a specific time or a set of times for STAs 120 to access a medium. For example, STA 120a transmits a request to AP 110 to schedule the TWT. The request to AP 110 can include a TWT element including TWT parameters that STA 120a uses to negotiate with AP 110. According to some embodiments, STA 120a transmits the request including the TWT element after receiving an indication from an application running on STA 120a. According to some examples, the application can include user applications such as, but not limited to, Siri™, FaceTime™, radio streaming, video streaming, remote control, and the like. The indication from the application can specify that the application desires to communicate with the wireless network of AP 110 (e.g., communicate application's traffic over the wireless network if AP 110). STA 120a can customize the TWT element in the request based on the application's traffic such that STA 120a and AP 110 can implement the TWT scheme with traffic differentiation and service period extension.

After receiving the request from STA 120a, AP 110 can determine and/or finalize the TWT parameters based at least on, for example, requests received from STAs 120, the quality of the medium to be accessed by AP 110 and STAs 120, different traffic information and requirements, and the like. After determining (and/or finalizing) the TWT parameters, AP 110 can send a response to STA 120a. The response includes a TWT element with the determined TWT parameters. STA 120a and AP 110 can use the TWT parameters to implement the TWT scheme.

Figure 2:
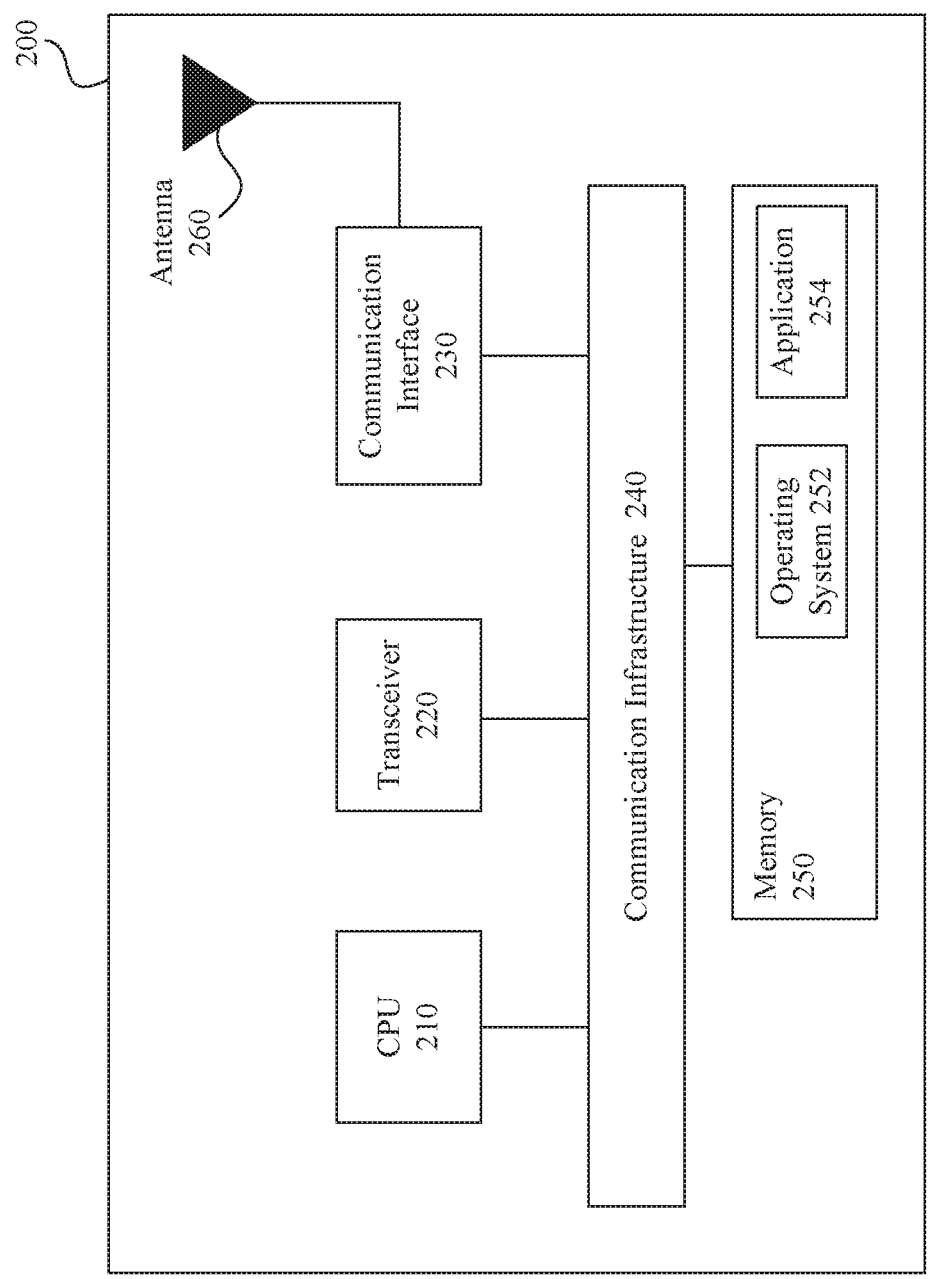
FIG. 2 illustrates a block diagram of an example wireless system of an electronic device implementing a TWT scheme with traffic differentiation and service period extension, according to some embodiments of the disclosure.

FIG. 2 illustrates a block diagram of an example wireless system 200 of an electronic device implementing a TWT scheme with traffic differentiation and service period extension, according to some embodiments of the disclosure. System 200 may be any of the electronic devices (e.g., AP 110, STA 120) of system 100. System 200 includes central processing unit (CPU) 210, transceiver 220, communication interface 230, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to CPU 210, transceiver 220, and/or communication interface 230. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

Alternatively or in addition to the operating system, system 200 can include communication infrastructure 240. Communication infrastructure 240 provides communication between, for example, CPU 210, transceiver 220, communication interface 230, and memory 250. In some implementations, communication infrastructure 240 may be a bus. CPU 210 together with instructions stored in memory 250 performs operations enabling wireless system 200 of system 100 to implement the TWT scheme with traffic differentiation and service period extension as described herein.

Transceiver 220 transmits and receives communications signals that support TWT functions, according to some embodiments, and may be coupled to antenna 260. Antenna 260 may include one or more antennas that may be the same or different types. Communication interface 230 allows system 200 to communicate with other devices that may be wired and/or wireless. Transceiver 220 and/or communication interface 230 can include processors, controllers, radios, sockets, plugs, and like circuits/devices used for connecting to and communication on networks. According to some examples, transceiver 220 and/or communication interface 230 include one or more circuits to connect to and communicate on wired and/or wireless networks. Transceiver 220 and/or communication interface 230 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 and/or communication interface 230 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including an Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11.

According to some embodiments, CPU 210, alone or in combination with memory 250, transceiver 220, and/or communication interface 230, implements the TWT scheme with traffic differentiation and service period extension. For example, CPU 210 receives an indication from an application in application 254 regarding the application's desire to communicate through a wireless network associated with an access point (e.g., AP 110) (e.g., communicate the application's traffic over the wireless network associated with the access point). CPU 210 also receives an indication of the application's traffic, according to some embodiments. CPU 210, alone or in combination with memory 250, transceiver 220, and/or communication interface 230, negotiates with AP 110 to set up a TWT corresponding to the application's traffic. For example, CPU 210 generates a TWT request with TWT parameters corresponding to the application's traffic, and causes the TWT request to be transmitted to AP 110. According to some embodiments, the TWT request can include an explicit indication whether the TWT parameters are for uplink and downlink traffic, only for downlink traffic, or only for uplink traffic. Additionally or alternatively, the TWT request can include an explicit indication about the traffic direction. For example, the TWT request can indicate whether the TWT parameters are for a one-directional traffic (only for uplink traffic or only for downlink traffic) or for a bidirectional/symmetrical traffic.

According to some embodiments, the TWT request can include an indication of the application's traffic pattern. The indication of the traffic pattern can include, but is not limited to, application traffic generation interval, traffic rate, or the like. Additionally or alternatively, the TWT request can include an indication of a specific traffic identifier (TID), an indication of a specific traffic, and/or an indication of access category (ACID) associated with the TWT. In some examples, system 200 and AP 110 can use the TWT scheme to allow the AP 110 to extend the service period(s) automatically.

Figure 3:
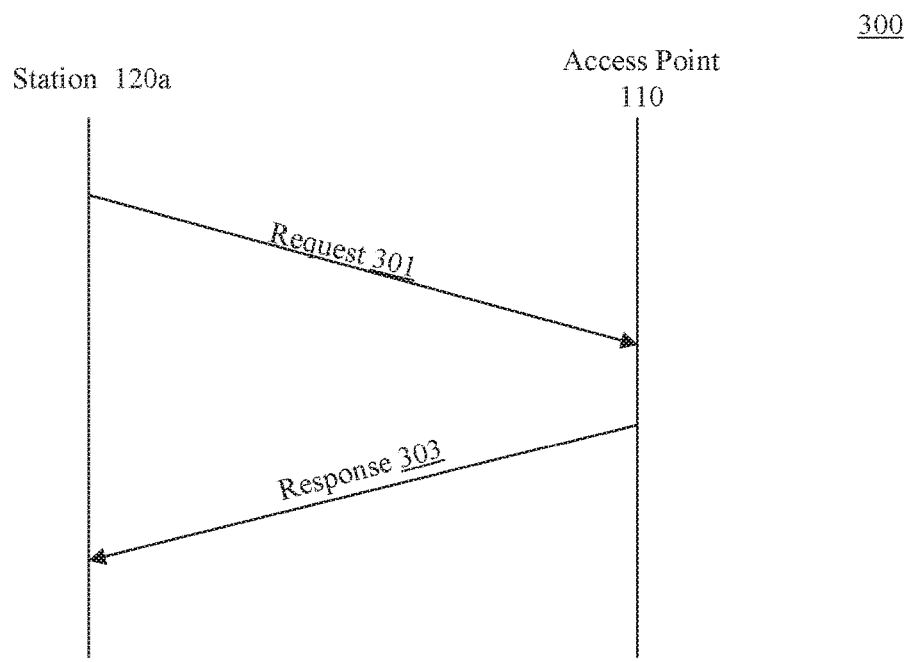
FIG. 3 illustrates example operations of communication between a station and an access point, according to some embodiments of the disclosure.

FIG. 3 illustrates example operations of communication between a station and an access point, according to some embodiments of the disclosure. FIG. 3 may be described with regard to elements of FIG. 1. Operation 300 of FIG. 3 may represent the communication between station 120a and access point 110.

According to some embodiments, station (STA) 120a transmits request 301 to access point (AP) 110 to set up a target wake time (TWT) for transmitting and/or receiving data. In general, the data communicated between STA 120a and AP 110 in the disclosed embodiments may be conveyed in packets or frames that are transmitted and received by radios in STA 120a and AP 110 in accordance with a communication protocol such as an Institute of Electrical and Electronics Engineers (IEEE) 802.11 standard, Bluetooth™ (from the Bluetooth Special Interest Group of Kirkland, Wash.), a cellular-telephone communication protocol, and/or another type of wireless interface (such as a peer-to-peer communication technique). Some of the embodiments are discussed with respect to wireless local area Network (WLAN), but the embodiments of this disclosure are not limited to WLAN.

According to some embodiments, request 301 can include a TWT element generated by STA 120a for negotiations with AP 110 to configure a TWT schedule. The TWT element can have a TWT schedule that is suitable for STA 120a and/or for its traffic. The TWT schedule indicates the time(s) for STA 120a to transmit and/or receive packets. In some examples, AP 110 can receive the TWT element from STA 120a and can confirm the TWT schedule in the TWT element. AP 110 can transmit response 303 to STA 120a confirming the TWT schedule. For example, response 303 can include a packet including the confirmation. Additionally or alternatively, response 303 can include a TWT element based on the TWT element in request 301 to confirm the TWT schedule. In some embodiments, AP 110 may make changes to the TWT schedule in the TWT element of request 301. For example, AP 110 can make changes to the TWT schedule in the TWT element of request 301 based at least on the information in the TWT element of request 301, other TWT requests received from other stations, capabilities of AP 110, the quality of medium, and the like. AP 110 can transmit response 303 to STA 120a. Response 303 can include a TWT element including the modified TWT schedule. Using request 301 and response 303, STA 120a and AP 110 can implement the TWT scheme with traffic differentiation and service period extension.

Figure 4:
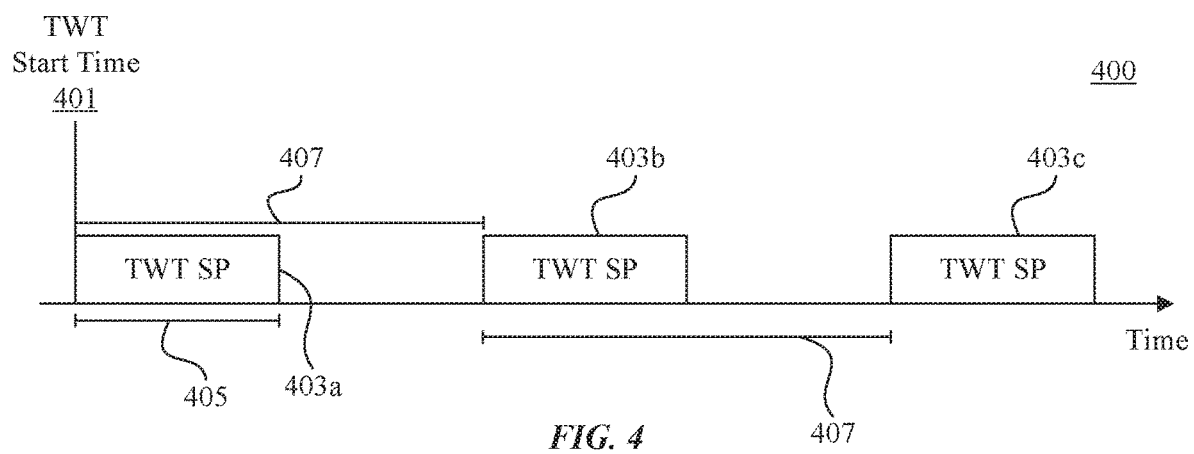
FIG. 4 illustrates an exemplary TWT flow, according to some embodiments of the disclosure.

FIG. 4 illustrates an exemplary TWT flow 400, according to some embodiments of the disclosure. TWT flow 400 can be based on the TWT schedule negotiated between a station and an access point. FIG. 4 may be described with regard to elements of FIG. 1.

TWT flow 400 includes TWT start time 401 that indicates when the TWT scheme starts, e.g., for STA 120a. According to some embodiments, this TWT scheme is specific to an application on STA 120a requesting to transmit and/or receive packets through AP 110. TWT flow 400 further includes service periods (SPs) 403a, 403b, and 403c. Service periods 403 are the time windows where STA 120a will be awake (e.g., in active mode) because STA 120a may transmit and/or receive packets during these service periods 403. Service periods 403 can have any duration, such as time duration 405. According to some examples, service periods 403a, 403b, and 403c have the same time duration 405. Alternatively, two or more of service periods 403a, 403b, and 403c can have different durations. TWT flow 400 also includes repetition intervals 407. A repetition interval 407 may be the interval between the respective start times of consecutive service periods (e.g., the interval between the start time of service period 403a and the start time of service period 403b). When a TWT service period is not ongoing, STA 120a can be asleep (e.g., power save mode) or can perform other activities as STA 120a does not expect to transmit and/or receive packets associated with this TWT scheme.

FIGS. 5A-5C illustrate an exemplary TWT element format for implementing a TWT scheme with traffic differentiation and service period extension, according to some embodiments of the disclosure. FIGS. 5A-5C may be described with regard to elements of FIGS. 1 and 3. The TWT element format illustrates the format of the TWT element transmitted by, for example, STA 120a in, for example, request 301. Additionally or alternatively, the TWT element format can be the format of the TWT element transmitted by, for example, AP 110 in, for example, response 301.

FIG. 5A illustrates TWT element 500. TWT element 500 can include different fields such as, but not limited to, any/all of element identifier (ID) 501, length 502, control 503, and TWT parameter information 504. The numbers under each field of TWT element 500 represent an exemplary size of the respective field of TWT element 500 in octets. In other implementations, other sizes can be used. TWT element 500 can be used for implementing the TWT scheme with traffic differentiation and service period extension.

FIG. 5B illustrates the format of TWT parameter information 504, according to some embodiments. As illustrated in FIG. 5B, TWT parameter information 504 can include, but is not limited to, any/all of request type 511, target wake time 512, TWT group assignment 513, nominal minimum TWT wake duration 514, TWT wake interval mantissa 515, TWT channel 516, and optional null data packet (NDP) paging 517. The numbers under each field of TWT parameter information 504 represent exemplary size of the respective field of TWT parameter information 504 in octets. In other implementations, other sizes can be used. These fields of TWT parameter information 504 define and configure the TWT schedule for implementing the TWT scheme with traffic differentiation and service period extension between STA 120a and AP 110.

According to some embodiments, request type 511 can include one or more subfields. For example, as illustrated in FIG. 5C, request type 511 can include, but is not limited to, any/all of TWT request subfield 531 (with length of, for example, 1 bit), TWT setup command subfield 532 (with length of, for example, 3 bits), reserved subfield 533 (with length of, for example, 1bit), implicit subfield 534 (with length of, for example, 1 bit), flow type subfield 535 (with length of, for example, 1 bit), TWT flow identifier 536 (with length of, for example, 3 bits), TWT wake interval exponent subfield 537 (with length of, for example, 5 bits), and TWT protection subfield 538 (with length of, for example, 1 bit). According to some examples, the TWT request subfield 531 of request type 511 can be set to "1" to indicate that TWT element 500 is being sent from a TWT requesting electronic device to a TWT responding electronic device (for example, TWT element 500 is part of request 301 of FIG. 3A.) The TWT request subfield 531 of request type 511 can be set to "0" to indicate that TWT element 500 is being sent from a TWT responding electronic device to a TWT requesting electronic device (for example, TWT element 500 is part of response 303 of FIG. 3A.)

According to some embodiments, STA 120a can use TWT element 500 to signal traffic direction indication. For example, when STA 120a receives an indication of traffic from one of its applications, STA 120a can signal information about the traffic (e.g., traffic direction) to AP 110 using TWT element 500. According to some embodiments, STA 120a can use reserved subfield 533 and/or implicit subfield 534 of request type 511 of TWT element 500 to signal the traffic direction. As a non-limiting example, reserved subfield 533 and implicit subfield 534 can be set to "00" to indicate that the TWT parameters are only for uplink traffic, can be set to "01" to indicate that the TWT parameters are only for downlink traffic, or can be set to "10" to indicate that the TWT parameters are for both uplink and downlink traffic. In this example, "11" can be reserved for other uses. As another non-limiting example, reserved subfield 533 (or implicit subfield 534) can be set to "0" to indicate that the TWT parameters are for one-directional traffic (e.g., only for uplink traffic) and can be set to "1" to indicate that the TWT parameters are for a bidirectional/symmetrical traffic.

Additionally or alternatively, other fields and/or subfields in TWT parameter information 504 of TWT element 500 and/or request type 511 of TWT element 500 can be used and/or re-purposed for signaling traffic direction. In some examples, a new subfield can be added to request type 511 of TWT element 500 for signaling traffic direction. In other examples, a new field can be added to TWT parameter information 504 of TWT element 500 for signaling traffic direction.

Although these examples are discussed with respect to TWT element 500, similar traffic direction information can be signaled using other signaling formats such as, but not limited to, a frame or an element such as a vendor specific information element (IE), in addition to or alternative to TWT element 500. For example, field(s) in the vendor specific IE can be re-purposed for traffic direction information. Additionally or alternative, one or more new field(s) can be defined and/or added in the vendor specific IE for traffic direction information. According to some embodiments, an association between the TE and the specific TWT schedule can be done through, for example, TWT flow identifier (ID) 536. For example, a specific TWT element can include the parameters associated with the specific TWT schedule (e.g., a TWT start time, the number of service period(s), duration(s) associated with the service period(s), repetition interval(s), and the like) and the IF can include the traffic direction information. An identifier in the IE associates the IE with the specific TWT element (e.g., using TWT flow identifier (ID) 536).

By signaling the traffic direction information to AP 110 during the negotiation and scheduling of the TWT scheme, AP 110 will have knowledge of the traffic direction. AP 110 can use the traffic direction information in determining the TWT schedule and the TWT parameters. For example, if an initiating application in STA 120a has symmetric bidirectional traffic, but STA 120a does not account for the downlink traffic when calculating the TWT parameters in the requesting TWT element, AP 110 can use the traffic direction information (indicating symmetric bidirectional traffic) in the requesting TWT element to modify the TWT parameters to account for both uplink and downlink traffic. For example, AP 110 can expand the TWT parameters in the requesting TWT element (e.g., to substantially twice) based at least in part on the traffic direction information to account for both uplink and downlink traffic. Accordingly, the modified TWT parameters can be adequate to accommodate both uplink and downlink traffic demand and therefore, improve latency and efficiency in the communication between STA 120a and AP 110.

According to some embodiments, STA 120a can use TWT element 500 to signal a traffic pattern indication. For example, when STA 120a receives an indication of traffic from one of its applications, STA 120a can signal information about the traffic (e.g., traffic pattern) to AP 110 using TWT element 500. According to some embodiments, STA 120a can use nominal minimum TWT wake duration field 514 and/or TWT wake interval mantissa field 515 of TWT parameter information 504 of TWT element 500 to signal the traffic pattern information. The traffic pattern information can include information associated with the initiating application's traffic including, but not limited to, application traffic generation interval, traffic rate, and the like, according to some examples. As a non-limiting example, STA 120a can use nominal minimum TWT wake duration field 514 of TWT parameter information 504 of TWT element 500 to signal the traffic rate. In this non-limiting example, the station can use TWT wake interval mantissa field 515 of TWT parameter information 504 of TWT element 500 to signal the application traffic generation interval.

Additionally or alternatively, other fields and/or subfields in TWT parameter information 504 of TWT element 500 and/or request type 511 of TWT element 500 can be used and/or re-purposed for signaling traffic pattern.

In some embodiments, a new subfield can be added to request type 511 of TWT element 500 for signaling the traffic pattern. In some examples, a new field can be added to TWT parameter information 504 of TWT element 500 for signaling the traffic pattern. The added new field for signaling the traffic pattern can include, for example, two subfields. Although these examples are discussed with respect to TWT element 500, similar traffic pattern information can be signaled using other signaling formats such as, but not limited to, a frame or an element such as a vendor specific IE, alternatively or in addition to TWT element 500. For example, field(s) in the vendor specific IF can be re-purposed for traffic pattern information. Additionally or alternatively, one or more new field(s) can be defined and/or added in the vendor specific IE for traffic pattern information. According to some embodiments, an association between the IE and the specific TWT schedule can be done through, for example, TWT flow identifier (ID) 536. For example, a specific TWT element can include the parameters associated with the specific TWT schedule (e.g., a TWT start time, the number of service period(s), duration(s) associated with the service period(s), repetition interval(s), and the like) and the IE can include the traffic pattern information. An identifier in the IE associates the IE with the specific TWT element (e.g., using TWT flow identifier (ID) 536).

By signaling the traffic pattern information to AP 110 during the negotiation and scheduling of the TWT scheme, AP 110 will have knowledge of the traffic pattern. AP 110 can use the traffic pattern information in determining the TWT schedule and the TWT parameters. For example, AP 110 can modify the TWT parameters in the requesting TWT element based at least in part on the traffic pattern information. Accordingly, the modified TWT parameters can be adequate to accommodate the specific traffic demand and therefore, improve latency and efficiency in the communication between STA 120a and AP 110.

According to some embodiments, STA 120a can use TWT element 500 to signal traffic identifier (TID) and/or access category indication (ACID). For example, when STA 120a receives an indication of a traffic from one of its applications, STA 120a can signal information about the traffic (e.g., TID and/or ACID) to AP 110 using TWT element 500. According to some embodiments, STA 120a can use TWT flow identifier 536 of request type 511 of TWT element 500 to signal TID and/or ACID. However, other fields and/or subfields in TWT parameter information 504 of TWT element 500 and/or request type 511 of TWT element 500 can be used and/or re-purposed for signaling TID and/or ACID.

Additionally or alternatively, a new subfield can be added to request type 511 of TWT element 500 for signaling TID and/or ACID. In some examples, a new field can be added to TWT parameter information 504 of TWT element 500 for signaling TID and/or ACID. Although these examples are discussed with respect to TWT element 500, similar information (TID and/or ACID) can be signaled using other signaling formats such as, but not limited to, a frame or an element such as a vendor specific IE, alternatively or in addition to TWT element 500. For example, field(s) in the vendor specific IE can be re-purposed for TID and/or ACID. Additionally or alternatively, one or more new fields can be defined and/or added in the vendor specific IE for TID and/or ACID. According to some embodiments, an association between the IE and the specific TWT schedule can be done through, for example, TWT flow identifier (ID) 536. For example, a specific TWT element can include the parameters associated with the specific TWT schedule (e.g., a TWT start time, the number of service period(s), duration(s) associated with the service period(s), repetition interval(s), and the like) and the IF can include TID and/or ACID. An identifier in the IE associates the IE with the specific TWT element (e.g., using TWT flow identifier (ID) 536).

According to some embodiments, STA 120a is configured to set up multiple TWT schemes with the access point when multiple applications on STA 120a have traffic. For example, the station can set up one TWT scheme for each corresponding application or for a set of corresponding applications. Additionally or alternatively, if an application has different types of traffic, STA 120a can set up different TWT schemes corresponding to particular types of traffic of the application. By using TID and/or ACID and signaling TID and/or ACID to AP 110 using TWT element 500, STA 120a and AP 110 can agree to transmit packets associated with each traffic instance on its corresponding TWT scheme (with its corresponding TID and/or ACID), according to some embodiments. As a non-limiting example, if a first application on STA 120a has audio traffic and a second application (same as or different from the first application) on STA 120a has video traffic, STA 120a can set up a first TWT scheme with a first TWT schedule and a first set of TWT parameter(s) (including, but not limited to, a first TID and/or ACID) for the audio traffic and can set up a second TWT scheme with a second TWT schedule and a second set of TWT parameter(s) (including, but not limited to, a second TID and/or ACID) for the video traffic. By using TID and/or ACID and signaling TID and/or ACID to AP 110 using TWT element 500, STA 120a and AP 110 can agree to transmit audio packets on the first TWT scheme set up for the audio traffic and transmit video packets on the second TWT scheme set up for the video traffic.

According to some embodiments, the TID and/or ACID are specific to one traffic instance and/or one traffic type. As a non-limiting example, TWT element 500 having a TID=1 to set up a TWT scheme can indicate that packets associated with traffic with TID 1 can be transmitted during this TWT scheme. Additionally or alternatively, the TID and/or ACID can indicate any traffic that has the same or higher priority than the indicated TIP and/or ACID can be transmitted during the TWT scheme. As a non-limiting example, TWT element 500 having an ACID=2 to set up a TWT scheme indicates that packets associated with traffic having ACID=0,1, or 2 can be transmitted during this TWT scheme, (where "0" is the highest priority). Additionally or alternatively, STA 120a can use TWT element 500 to signal a combined TID and/or a combined ACID. For example, a combined TID and/or a combined ACID can designate a combination of certain TIDs and/or ACIDs. As a non-limiting example, TWT element 500 having a combined TID=8 to set up a TWT scheme can indicate that packets associated with traffic having TID 0 and YID 1 can be transmitted during this TWT scheme.

Figure 6A:
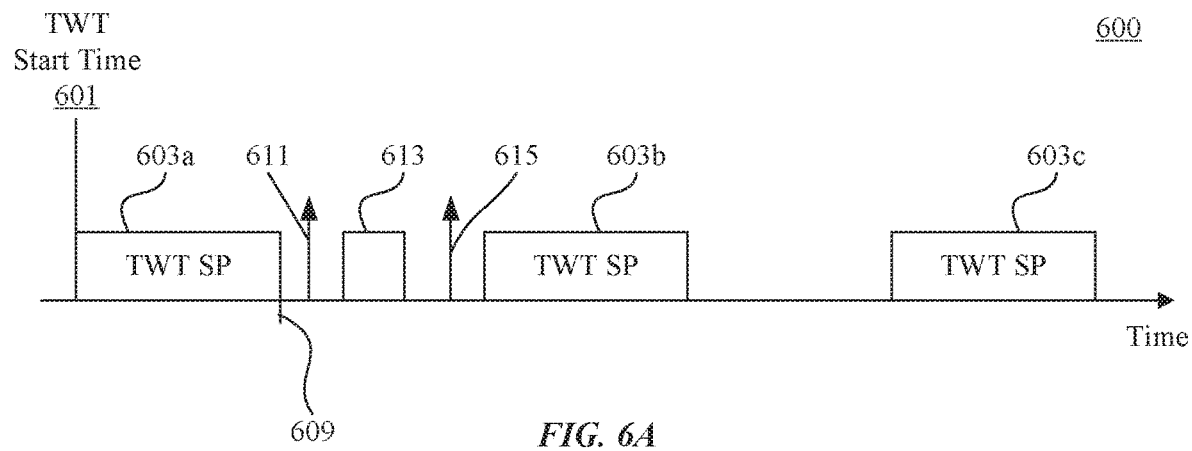
FIGS. 6A-6B illustrate exemplary TWT flows for flexible service period extension, according to some embodiments of the disclosure.
Figure 6B:
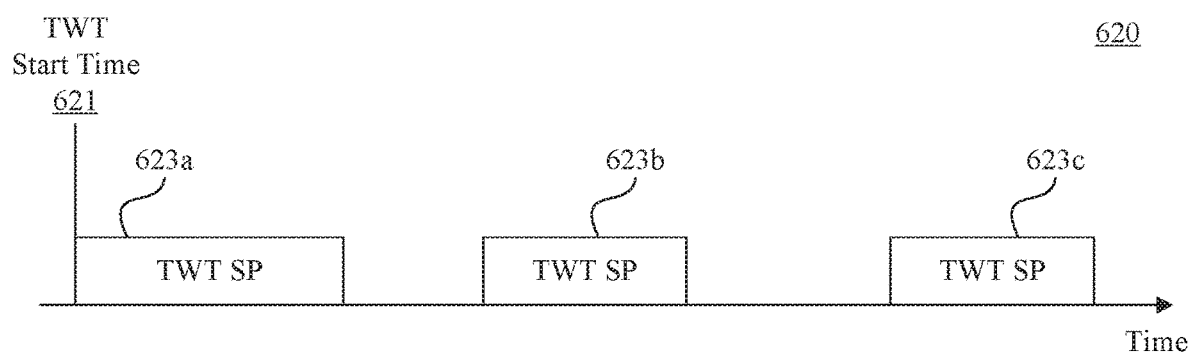

FIGS. 6A-6B illustrate exemplary TWT flows for flexible service period extension, according to some embodiments of the disclosure. TWT flows 600 and 620 can be based on the TWT schedule negotiated between a station and an access point. FIGS. 6A-6B may be described with regard to elements of FIG. 1.

FIG. 6A illustrates TWT flow 600, which includes TWT start time 601 indicating when the TWT scheme starts, e.g., for STA 120a. TWT flow 600 further includes service periods 603a, 603b, and 603c. Service periods 603 are the time windows where STA 120a will be awake (e.g., in active mode) because STA 120a may transmit and/or receive packets during these service periods 603. In one example, the access point (e.g., AP 110) transmits queued downlink packet(s) during service period 603a, but AP 110 cannot finish transmitting the queued downlink packet(s) during service period 603a in this example. Accordingly, in this example, AP 110 may use the "More Data" field in the MAC header in the last packet sent to STA 120a during service period 603a to inform the STA 120a that one or more packets are to be sent. In this example, however, STA 120a is considered in sleep mode (e.g., power save mode) after the end point 609 of service period 603a. After receiving the "More Data" field in the MAC header in the last packet during service period 603a, STA 120a may send a response 611 in which the power management (PM) indication bit is set to "0" (to indicate that STA 120a is now in awake mode (e.g., active mode)) before AP 110 can transmit the rest of the queued downlink packet(s) during period 613. After AP 110 sends the rest of the queued downlink packet(s) and indicates the end of the queued downlink traffic, STA 120a can send another response 615 in which the power management (PM) indication bit is set to "1" before STA 120a can transition to the sleep mode (e.g., power save mode). The transmission of the responses including the PM indication bit consumes energy at STA 120a and consumes communication time between STA 120 and AP 110, specifically in a congested transmission environment.

FIG. 6B illustrates TWT flow 620 for a TWT scheme with flexible service period extension mechanism, according to some embodiments. When STA 120a is in the process of associating with AP 110 to join the wireless network of AP 110, STA 120a can inform AP 110 that STA 120a is configured to support flexible service period extension. In other words, STA 120a can indicate to AP 110 that STA 120a is configured for enforced awake operation by AP 110. For example, one or more bits (and/or fields) can be added (and/or re-purposed) in a high efficiency (HE) capability information element communicated from STA 120a to AP 110 to indicate STA 120a's capability to support flexible service period extension.

As illustrated in FIG. 6B, MT flow 620 includes TWT start time 621 indicating when the TWT scheme starts, e.g., for STA 120a. TWT flow 620 further includes extended service period 623a and service periods 623b, 623c. In one example, when the access point (e.g., AP 110) transmits queued downlink packet(s) during service period 603a of FIG. 6A, but AP 110 cannot finish transmitting the downlink packet(s) during service period 603a of FIG. 6A, AP 110 may request/enforce STA 120a to remain awake after end point 609 of service period 603a of FIG. 6A. If STA 120a has indicated its capability to support flexible service period extension and AP 110 uses the "More Data" field in the MAC header in the last packet sent to STA 120a during service period 603a of FIG. 6A, STA 120a is configured to extend the service period to extended service period 623a. In other words, STA 120a stays in awake mode (e.g., active mode) during the extended service period 623a (e.g., after end point 609 of service period 603 of FIG. 6A) until the "More Data" field of the packet sent by AP 110 is set to "0".

Therefore, without consuming energy and communication time, the service period can be extended to accommodate the one or more remaining queued downlink packet(s).

Figure 7:
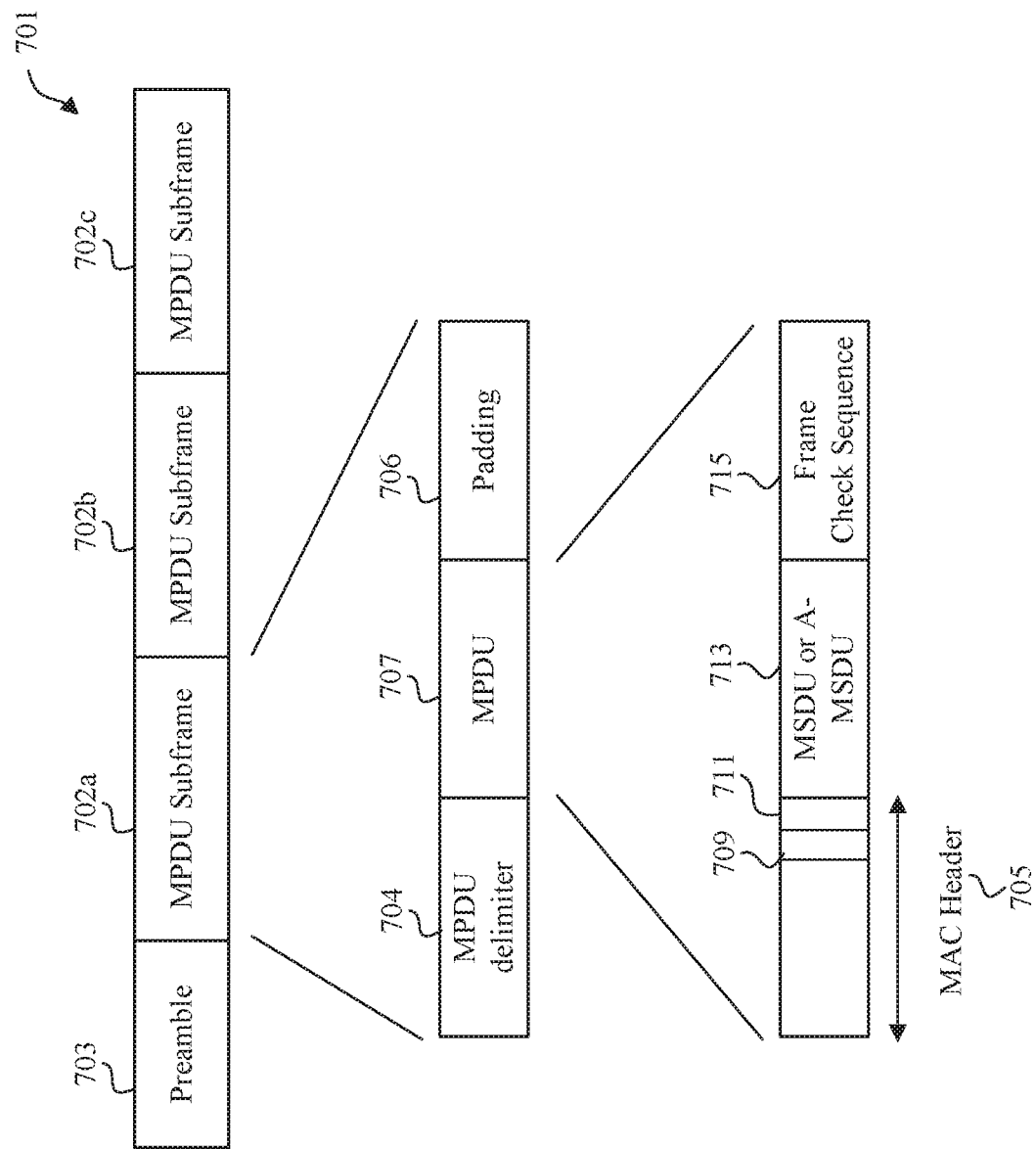
FIG. 7 illustrates an example frame format, according to some embodiments of the disclosure.

FIG. 7 illustrates an example frame format, which can be communicated between STA 120a and AP 110 using the TWT scheme with traffic differentiation and service period extension, according to some embodiments of the disclosure. For example, FIG. 7 illustrates an exemplary format of physical layer convergence protocol data unit (PPM) 701. PPDU 701 can include packets and/or frames communicated between a station (e.g., STA 120a) and an access point (e.g., AP 110) or other packets and/or frames discussed herein, according to some examples. PPM 701 includes one or more MAC protocol data unit (MPDU) subframes 702a-c and preamble 703. Preamble 703 can include a physical layer preamble and/or physical layer header. Preamble 703 can include information used for carrier acquisition, synchronization, channel estimation, communicating frame specific parameters (e.g., coding rate, frame length, etc.), or other purposes.

MPDU subframe 702 can include fields such as, but not limited to, MPDU delimiter 704, MPDU 707, and padding 706. MPDU delimiter 704 can include information on MPDU length, cyclic redundancy checks (CRC), and/or a unique pattern. Padding 706 can include frame check sequence (FCS) for error-detection and/or additional padding (e.g., 0 to 3 bytes) to compensate for different lengths of different MPDUs. MPDU 707 can include media access control (MAC) header 705, MAC service data unit (MSDU) and/or aggregated MSDU (A-MDSU) 713, and frame check sequence (FCS) 715, according to some embodiments. If MPDU 707 includes A-MSDU 713, A-MSDU 713 can include one or more A-MSDU subframes, where each A-MSDU subframe can include an A-MSDU subframe header, an MSDU, and a padding, according to some embodiments. According to some examples, the packets and/or frames communicated between STA 120a and AP 110 are encoded within one or more MPDUs 707.

In some examples MAC header 705 can include fields such as, but not limited to, frame control, duration field, address(es), sequence control, and quality of service (QoS) control as understood by a person of ordinary skill in art. The frame control of MAC header 705 can include More Data field 709 discussed above with respect to FIGS. 6A-6B. The QoS control of MAC header 705 can include a field 711 indicating the traffic identifier (TID). In a non-limiting example, TID field 711 of QoS control can include four bits. The TID can indicate the stream of frames to which MSDU 713 belongs. According to some embodiments, an electronic device (e.g., STA 120a) can transmit multiple streams of frames with different QoS requirements. The TID is used to differentiate between the multiple streams of frames. According to some examples, the TID can also identify user priority (UP) and/or traffic Access Category (AC) of QoS, for example, for MSDU 713. As a non-limiting example, the wireless network of AP 110 can provide 8 user priorities and 4 QoS Access Categories. Other numbers of user priorities and/or QoS Access Categories can be used in other implementations.

It is noted that frame format of PPDU 701 is provided as one example, and the embodiments of this disclosure are not limited to this example.

Figure 8:
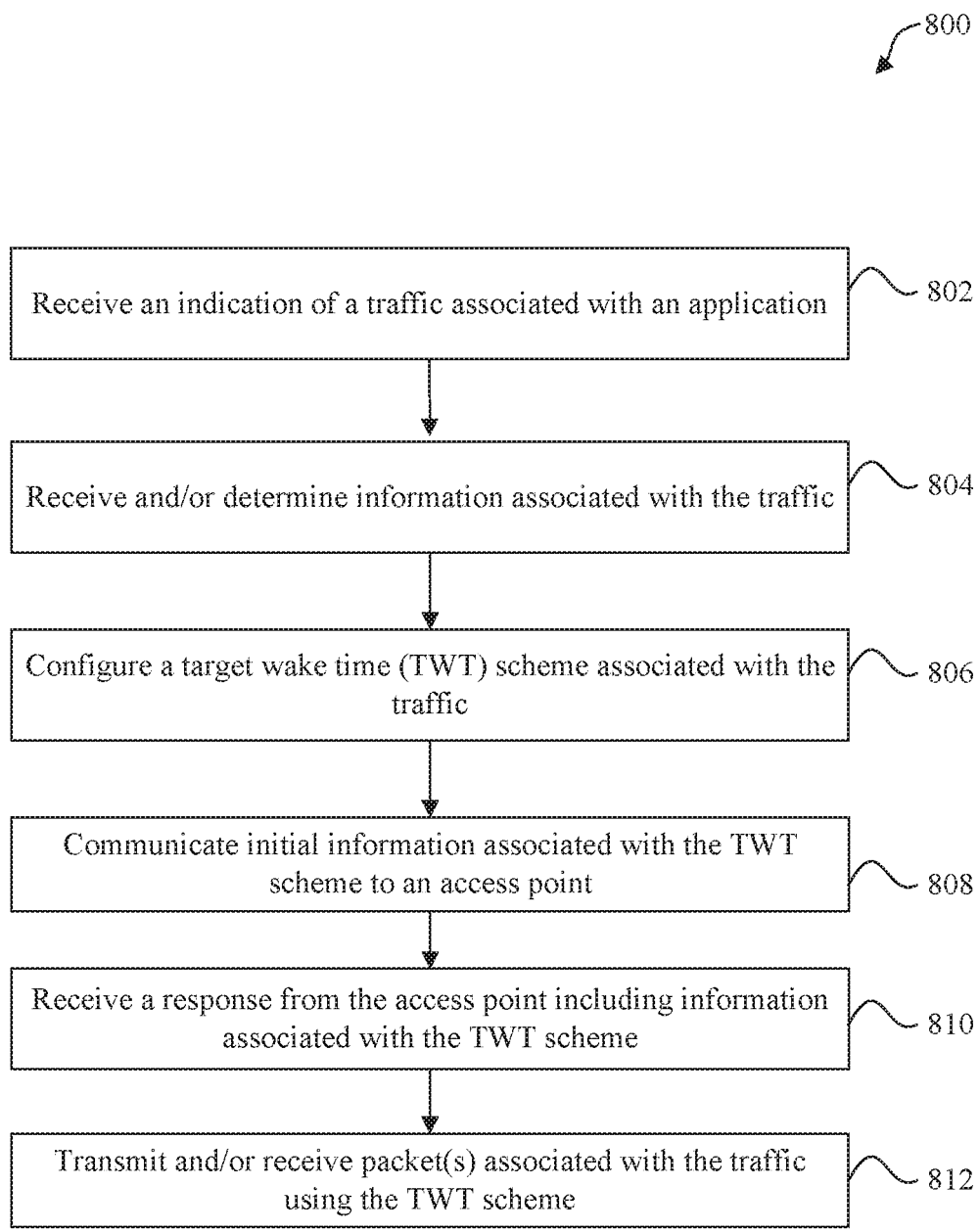
FIG. 8 illustrates an example method for a wireless system that supporting implementing a TWT scheme with traffic differentiation, according to some embodiments of the disclosure.

FIG. 8 illustrates an example method 800 for a wireless system supporting implementing TWT scheme with traffic differentiation, according to some embodiments of the disclosure. As a convenience and not a limitation, FIG. 8 may be described with regard to elements of FIGS. 1-5. Method 800 may represent the operation of station (STA) 120a of FIG. 1 implementing TWT scheme with traffic differentiation. Method 800 may also be performed by system 200 of FIG. 2 and/or computer system 1000 of FIG. 10. But method 800 is not limited to the specific embodiments depicted in those figures and other systems may be used to perform the method as will be understood by those skilled in the art. It is to be appreciated that not all operations may be needed, and the operations may not be performed in the same order as shown in FIG. 8.

At 802, STA 120a receives an indication of traffic associated with an application. For example, a client application on STA 120a requests for communication using access point (AP) 110. CPU 210, alone or in combination with transceiver 220 and/or communication interface 230, may receive the request and the indication of the traffic from a client application on application 254 of memory 250.

At 804, STA 120a determines and/or receives information associated with the traffic. The information associated with the traffic can include, but is not limited to, traffic direction information, traffic pattern information (e.g., application traffic generation interval, traffic rate, traffic type, and the like), traffic identifier (TID), access category indication (ACID), or the like.

At 806, STA 120a configures a target wake time (TWT) scheme associated with the traffic. For example, STA 120a determines the parameters associated with the TWT scheme for the traffic (e.g., configures the TWT schedule). These parameters can include, but are not limited to, a TWT start time indicating when the TWT scheme begins, the number of service period(s), duration(s) associated with the service period(s), repetition interval(s) indicating an interval for repeating the service period(s), and the like. STA 120a can use the information associated with the traffic to configure the TWT scheme. The TWT scheme can be customized to the traffic, according to some examples.

According to some embodiments, in configuring the TWT scheme, STA 120a generates an initial TWT element for negotiations with AP 110. The initial TWT element includes initial TWT parameters determined by STA 120a. Additionally, the initial TWT element can include information associated with the traffic. The information associated with the traffic can include, but is not limited to, traffic direction information, traffic pattern information (e.g., application traffic generation interval, traffic rate, and the like), traffic identifier (TID), access category indication (ACID), or the like. STA 120a generates the initial TWT element as discussed above with respect to FIGS. 5A-5B. Additionally or alternatively, in configuring the TWT scheme, STA 120a generates an initial information element (IE) (e.g., a vendor specific IE) for negotiations with AP 110. The initial IE may include initial TWT parameters determined by STA 120a. Additionally, the initial IE can include information associated with the traffic. The information associated with the traffic can include, but is not limited to, traffic direction information, traffic pattern information (e.g., application traffic generation interval, traffic rate, and the like), traffic identifier (TID), access category indication (ACID), or the like. STA 120a generates the initial IE as discussed above with respect to FIGS. 5A-5B.

At 808, STA 120a communicates initial information associated with the TWT scheme to AP 110. The initial information can include the initial TWT element, the initial 1E, or other signaling formats generated at 806. According to some examples, STA 120a transmits request 301 of FIG. 3 to AP 110. Request 301 can include the initial information associated with the TWT scheme (e.g., the initial TWT element and/or the initial IE.)

At 810, STA 120*a* receives a response from AP 110. For example, STA 120*a* receives response 303. Response 303 can include information associated with the TWT scheme. For example, response 303 can include another TWT element (and/or another IE) including TWT parameters. In some embodiments, the TWT parameters are the same as the initial TWT parameters in the initial TWT element (and/or the initial IE) transmitted by STA 120*a*. In these examples, AP 110 has approved/confirmed the initial TWT parameters without any changes. If AP 110 approves the initial TWT parameters without any change, AP 110 can transmit a confirmation indications instead of (or in addition to) transmitting the TWT element.

Alternatively, AP 110 may change one or more of the initial TWT parameters of the initial TWT element (and/or the initial IE) transmitted by STA 120*a*. In these examples, AP 110 may transmit, in response 303, a TWT element (and/or an IE) including the revised TWT parameters.

After the TWT scheme is set up between STA 120*a* and AP 110 using the approved or revised TWT parameters, STA 120*a* may transmit and/or receive packet(s) associated with the traffic using the TWT scheme, at 812.

Figure 9:
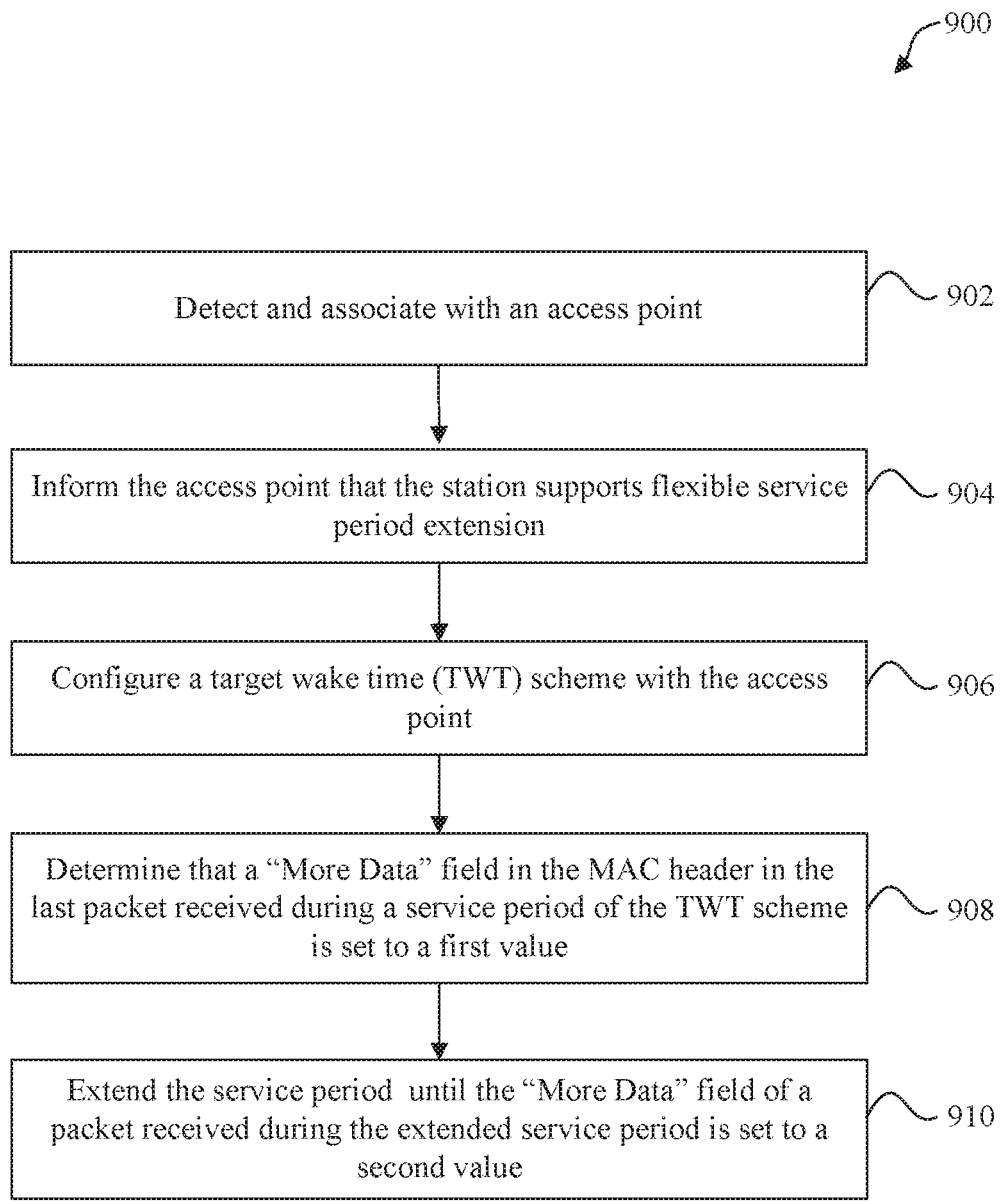
FIG. 9 illustrates an example method 900 for implementing a TWT scheme with a flexible service period extension mechanism, according to some embodiment of the disclosure.

FIG. 9 illustrates an example method 900 for implementing a TWT scheme with a flexible service period extension mechanism, according to some embodiment of the disclosure. As a convenience and not a limitation, FIG. 9 is described with respect to FIGS. 1-8. Method 900 may represent the operation of station (STA) 120*a* of FIG. 1 implementing TWT scheme with traffic differentiation. Method 900 may also be performed by system 200 of FIG. 2 and/or computer system 1000 of FIG. 10. But method 900 is not limited to the specific embodiments depicted in those figures and other systems may be used to perform the method as will be understood by those skilled in the art. It is to be appreciated that not all operations may be needed, and the operations may not be performed in the same order as shown in FIG. 9.

Additionally, method 900 can be performed in conjunction with method 800 of FIG. 8. For example, operation 906 of method 900 can be performed using method 800 of FIG. 8.

At 902, a station (e.g., STA 120*a*) detects and associates with an access point (e.g., AP 110) to join the wireless network of AP 110. At 904, STA 120*a* informs AP 110 that STA 120*a* supports flexible service period extension. In other words, STA 120*a* can indicate to AP 110 that STA 120*a* is configured for enforced awake operation by AP 110. For example, one or more bits (and/or fields) can be added (and/or re-purposed) in a high efficiency (HE) capability information element communicated from STA 120*a* to AP 110 to indicate STA 120*a*'s capability to support flexible service period extension.

At 906, STA 120*a* and AP 110 configure a target wake time (TWT) scheme. According to some embodiments, 906 can be performed using method 800 of FIG. 8.

During the service period(s) of the TWT scheme, STA 120*a* may communicate with AP 110. In one example, when AP 110 transmits queued downlink packet(s) during a service period (e.g., service period 603*a* of FIG. 6A) but AP 110 cannot finish transmitting the downlink packet(s) during that service period, AP 110 may request/enforce STA 120*a* to remain awake after the end point of that service period (e.g., end point 609 of service period 603*a* of FIG. 6A.) Since STA 120*a* has indicated its capability to support flexible service period extension at 904, AP 110 uses the "More Data" field in the MAC header in the last packet sent to STA 120*a* during the service period (e.g., service period 603*a* of FIG. 6A) to extend the service period to an extended service period.

In other words, at 908, STA 120*a* receives the last packet sent during that service period and examines the "More Data" field in the MAC header of the last packet. STA 120*a* determines that the "More Data" field in the MAC header in the last packet is set to a first value (e.g., "1"). At 910, STA 120*a* extends the service period until the "More Data" field of a packet received during the extend service period is set to a second value (e.g., "0".) In other words, STA 120*a* stays in awake mode (e.g., active mode) during the extended service period (e.g., extend service period 623*a* of FIG. 6B—after end point 609 of service period 603 of FIG. 6A) until the "More Data" field of a packet sent by AP 110 is set to the second value (e.g., "0"). In this example, STA 120*a* may receive a packet from AP 110 after end point 609 of service period 603, STA 12*a* may determine that a "More Data" field in a MAC header associated with the receive packet is set to the second value (e.g., "0"), and STA 120*a* may transition to sleep mode (e.g., power save mode.)

Figure 10:
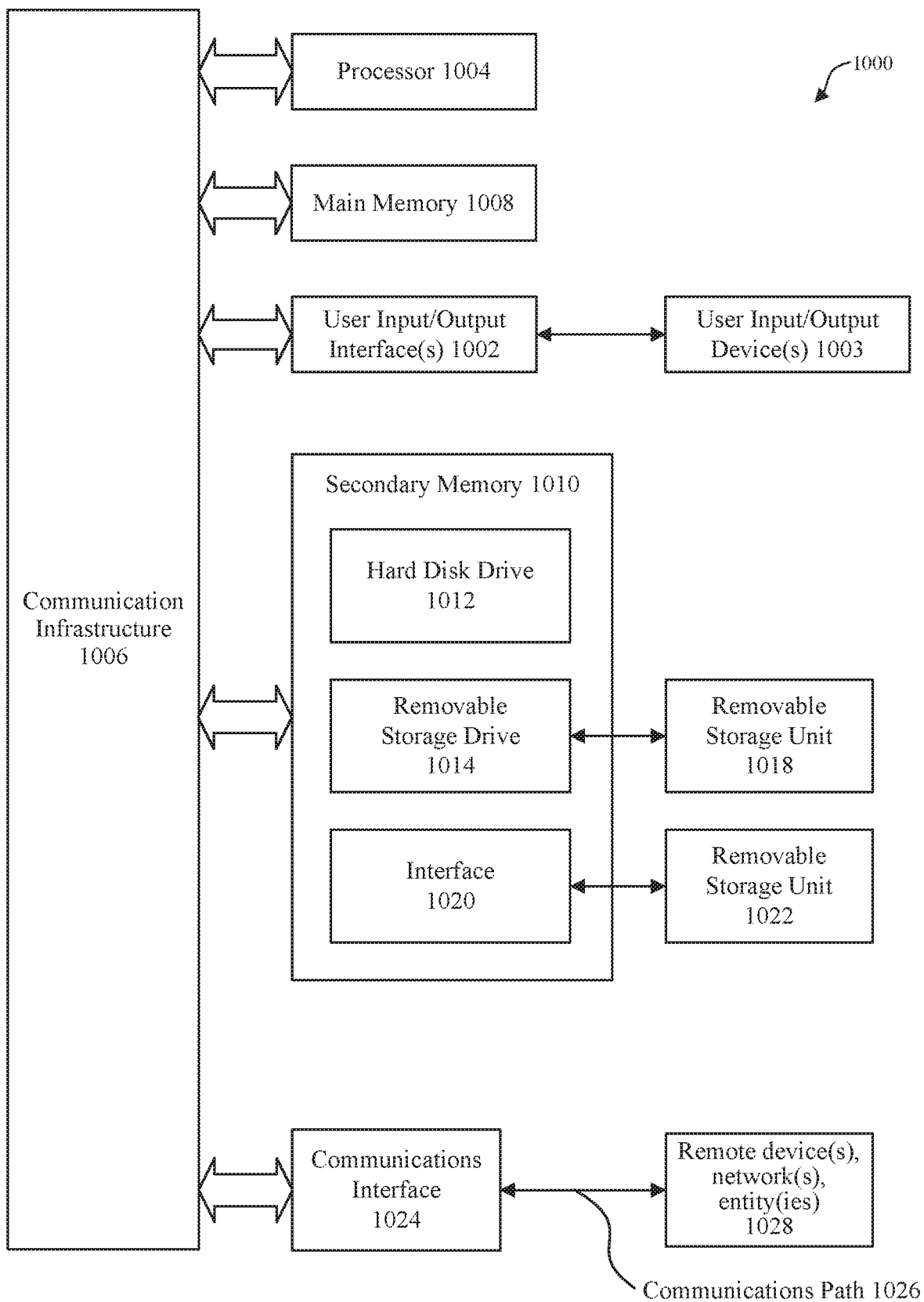
FIG. 10 is an example computer system for implementing some embodiments or portion(s) thereof.

Various embodiments can be implemented, for example, using one or more computer systems, such as computer system 1000 shown in FIG. 10. Computer system 1000 can be any well-known computer capable of performing the functions described herein such as devices 110, 120 of FIG. 1, or 200 of FIG. 2. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc, (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
   a transceiver configured to communicate over a wireless network; and
   one or more processors communicatively coupled to the transceiver and configured to:
   receive, from an application of the electronic device, an indication of traffic associated with the application, wherein the traffic is to be communicated using an access point over the wireless network;
   determine information associated with the traffic;
   configure a target wake time (TWT) scheme associated with the traffic based at least in part on the determined information associated with the traffic; and
   transmit, using the transceiver, a TWT request comprising initial information associated with the TWT scheme to the access point of the wireless network, wherein the initial information associated with the TWT scheme comprises at least one of traffic direction information, traffic pattern information, a traffic identifier (TID), or an access category indication (ACID).

2. The electronic device of claim 1, wherein to configure the TWT scheme the one or more processors are configured to:
   generate an initial information element, wherein the initial information element includes the initial information associated with the TWT scheme.

3. The electronic device of claim 2, wherein the initial information element comprises at least one of:
   a first field corresponding to the traffic pattern information,
   a first subfield of a second field corresponding to the traffic direction information, or
   a second subfield of the second field corresponding to the TID or the ACID.

4. The electronic device of claim 1, wherein to configure the TWT scheme the one or more processors are configured to:
   generate an initial TWT element, wherein the initial TWT element includes the initial information associated with the TWT scheme.

5. The electronic device of claim 4, wherein the initial TWT element comprises at least one of:
   a first field corresponding to the traffic pattern information, a first subfield of a second field corresponding to the traffic direction information, or a second subfield of the second field corresponding to the TID or the ACID.

6. The electronic device of claim 4, wherein:

the traffic pattern information comprises a traffic generation interval and a traffic rate, and the initial TWT element comprises a first field corresponding to the traffic generation interval and a second field corresponding to the traffic rate.

7. The electronic device of claim 4, wherein:

the initial TWT element comprises two subfields corresponding to the traffic direction information, the two subfields are set to a first value to indicate that the initial information associated with the TWT scheme is for uplink traffic, the two subfields are set to a second value to indicate that the initial information associated with the TWT scheme is for downlink traffic, and the two subfields are set to a third value to indicate that the initial information associated with the TWT scheme is for bidirectional traffic.

8. The electronic device of claim 1, wherein the one or more processors are further configured to:

receive a response from the access point including subsequent information associated with the TWT scheme; and communicate, based on the response, one or more packets associated with the traffic using the TWT scheme.

9. The electronic device of claim 1, wherein the one or more processors are further configured to:

receive a packet from the access point before an initial end point of a service period associated with the TWT scheme;

determine that a More Data field in a media access control (MAC) header associated with the packet is set to a first value; and expand the service period beyond the initial end point based on the first value, wherein the electronic device is in an active mode during the expanded service period.

10. The electronic device of claim 9, wherein the one or more processors are further configured to:

receive a second packet from the access point after the initial end point of the service period;

determine that a More Data field in a MAC header associated with the second packet is set to a second value; and transition to a power save mode based on the second value.

11. A method, comprising:

receiving, from an application of an electronic device, an indication of traffic associated with the application, wherein the traffic is to be communicated using an access point over a wireless network;

determining information associated with the traffic, wherein the information comprises at least one of traffic direction information, traffic pattern information, a traffic identifier (TID), or an access category indication (ACID);

configuring a target wake time (TWT) scheme associated with the traffic based at least in part on the determined information;

generating an initial TWT element associated with the TWT scheme; and transmitting the initial TWT element to the access point of the wireless network, wherein the initial TWT element comprises at least one of the traffic direction information, the traffic pattern information, the TID, or the ACID.

12. The method of claim 11, wherein the initial TWT element comprises at least one of:

a first field corresponding to the traffic pattern information, a first subfield of a second field corresponding to the traffic direction information, or a second subfield of the second field corresponding to the TID or ACID.

13. The method of claim 11, wherein:

the traffic pattern information comprises a traffic generation interval and a traffic rate, and the initial TWT element comprises a first field corresponding to the traffic generation interval and a second field corresponding to the traffic rate.

14. The method of claim 11, wherein:

the initial TWT element comprises two subfields corresponding to the traffic direction information, the two subfields are set to a first value to indicate that TWT parameters are for uplink traffic, the two subfields are set to a second value to indicate that the TWT parameters are for downlink traffic, and the two subfields are set to a third value to indicate that the TWT parameters are for bidirectional traffic.

15. The method of claim 11, further comprising:

receiving a response from the access point including a subsequent TWT element associated with the TWT scheme; and communicating, based on the response, one or more packets associated with the traffic using the TWT scheme.

16. The method of claim 11, further comprising:

receiving a packet from the access point before an initial end point of a service period associated with the TWT scheme;

determining that a More Data field in a media access control (MAC) header associated with the packet is set to a first value; and expanding the service period beyond the initial end point based on the first value, wherein the electronic device is in an active mode during the expanded service period.

17. The method of claim 16, further comprising:

receiving a second packet from the access point after the initial end point of the service period;

determining that a More Data field in a MAC header associated with the second packet is set to a second value; and transitioning to a power save mode based on the second value.

18. A non-transitory computer-readable medium storing instructions that, when executed by a processor of an electronic device, cause the processor to perform operations, the operations comprising:

determining information associated with traffic of an application of the electronic device, wherein the traffic is to be communicated over a wireless network and wherein the information comprises at least one of traffic direction information, traffic pattern information, a traffic identifier (TID), or an access category indication (ACID);

configuring a target wake time (TWT) scheme associated with the traffic based at least in part on the determined information;

generating an initial TWT element associated with the TWT scheme; and communicating the initial TWT element to an access point of the wireless network, wherein the initial TWT element comprises:
- a first field corresponding to the traffic pattern information associated with the traffic,
- a first subfield of a second field corresponding to the traffic direction information associated with the traffic, and
- a second subfield of the second field corresponding to the TID or ACID associated with the traffic.

19. The non-transitory computer-readable medium of claim 18, wherein the operations further comprising:
receiving a response from the access point including information associated with the TWT scheme; and
communicating, based on the response, one or more packets associated with the traffic using the TWT scheme.

20. The non-transitory computer-readable medium of claim 18, wherein the operations further comprising:
receiving a packet from the access point before an initial end point of a service period associated with the TWT scheme;
determining that a More Data field in a media access control (MAC) header associated with the packet is set to a first value;
expanding the service period beyond the initial end point based on the first value, wherein the electronic device is in an active mode during the expanded service period;
receiving a second packet from the access point after the initial end point of the service period;
determining that a More Data field in a MAC header associated with the second packet is set to a second value; and
transitioning to a power save mode based on the second value.

* * * * *

UNITED STATES PATENT AND TRADEMARK OFFICE
CERTIFICATE OF CORRECTION

PATENT NO.         : 11,770,731 B2
APPLICATION NO.    : 16/555356
DATED              : September 26, 2023
INVENTOR(S)        : Li et al.

It is certified that error appears in the above-identified patent and that said Letters Patent is hereby corrected as shown below:

On the Title Page

Column 2, Item (57), under "ABSTRACT", Line 17, delete "category," and insert -- category --, therefor.

In the Specification

In Column 9, Line 24, delete "TE" and insert -- IE --, therefor.

In Column 9, Line 30, delete "IF" and insert -- IE --, therefor.

In Column 10, Line 22, delete "IF" and insert -- IE --, therefor.

In Column 11, Line 12, delete "IF" and insert -- IE --, therefor.

In Column 11, Line 51, delete "TIP" and insert -- TID --, therefor.

In Column 11, Line 63, delete "YID" and insert -- TID --, therefor.

In Column 12, Line 49, delete "MT" and insert -- TWT --, therefor.

In Column 13, Line 9, delete "(PPM)" and insert -- (PPDU) --, therefor.

In Column 13, Line 13, delete "PPM" and insert -- PPDU --, therefor.

Signed and Sealed this
Twenty-first Day of November, 2023

*Katherine Kelly Vidal*

Katherine Kelly Vidal
*Director of the United States Patent and Trademark Office*

Page 1 of 1